US009535517B2

(12) United States Patent
Lee et al.

(10) Patent No.: US 9,535,517 B2
(45) Date of Patent: Jan. 3, 2017

(54) TRANSPARENT ADHESIVE UNIT AND TOUCH SCREEN HAVING THE SAME

(75) Inventors: Yeong-Seop Lee, Gumi-si (KR); Myung-Sop Lee, Gumi-si (KR); Yong-Gu Cho, Uiwang-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 759 days.

(21) Appl. No.: 13/486,320

(22) Filed: Jun. 1, 2012

(65) Prior Publication Data

US 2012/0306791 A1 Dec. 6, 2012

(30) Foreign Application Priority Data

Jun. 2, 2011 (KR) .................. 10-2011-0053240

(51) Int. Cl.
*B32B 7/12* (2006.01)
*G06F 3/041* (2006.01)

(52) U.S. Cl.
CPC .......... *G06F 3/041* (2013.01); *Y10T 428/2848* (2015.01)

(58) Field of Classification Search
None
See application file for complete search history.

(56) References Cited

U.S. PATENT DOCUMENTS

| | | | |
|---|---|---|---|
| 2003/0067449 A1* | 4/2003 | Yoshikawa | G06F 3/016 345/173 |
| 2004/0119403 A1* | 6/2004 | McCormick | H01L 27/3211 313/506 |
| 2008/0278456 A1* | 11/2008 | Huang | G06F 3/0412 345/173 |
| 2009/0160819 A1 | 6/2009 | Sasaki et al. | |
| 2010/0128002 A1 | 5/2010 | Stacy et al. | |
| 2011/0090159 A1 | 4/2011 | Kurashima | |
| 2011/0109564 A1 | 5/2011 | Lee et al. | |
| 2011/0109583 A1* | 5/2011 | Lee | 345/174 |
| 2011/0213225 A1* | 9/2011 | Bernstein | G06Q 50/22 600/309 |
| 2011/0279383 A1* | 11/2011 | Wilson et al. | 345/173 |
| 2012/0182249 A1 | 7/2012 | Endo et al. | |

FOREIGN PATENT DOCUMENTS

| | | |
|---|---|---|
| CN | 101057210 A | 10/2007 |
| CN | 201590065 U | 9/2010 |
| EP | 2 073 107 A1 | 6/2009 |
| JP | 2009-086184 A | 4/2009 |
| WO | 2011/040291 A1 | 4/2011 |

OTHER PUBLICATIONS

Tada, JP 2009-086184A, Machine Translation.*
Gupta et al., What's the Difference Between Silver Nanowire and ITO for Touchscreens?, Electronic Design, 2013, pp. 1-7.*

* cited by examiner

*Primary Examiner* — Callie Shosho
*Assistant Examiner* — Patrick English
(74) *Attorney, Agent, or Firm* — Jefferson IP Law, LLP

(57) ABSTRACT

A transparent adhesive unit for a touch screen is provided. The transparent adhesive unit includes a transparent film, a noise-blocking layer located on a first surface of the transparent film and formed of a conductive material, a first adhesive layer located on a surface of the noise-blocking layer, and a second adhesive layer located on a second surface of the transparent film, in which the second surface is positioned in opposition to the first surface.

12 Claims, 3 Drawing Sheets

TRANSPARENT ADHESIVE UNIT AND TOUCH SCREEN HAVING THE SAME

PRIORITY

This application claims the benefit under 35 U.S.C. §119 (a) of a Korean patent application filed in the Korean Intellectual Property Office on Jun. 2, 2011 and assigned Serial No. 10-2011-0053240, the entire disclosure of which is hereby incorporated by reference.

BACKGROUND OF THE INVENTION

1. Field of the Invention

The present invention relates to a touch screen. More particularly, the present invention relates to a capacitive type touch screen.

2. Description of the Related Art

Generally, the term "touch screen" refers to a device in which an input detection means is integrated with a display means. The touch screen may include a display unit, such as a Liquid Crystal Display (LCD), and a touch panel disposed on the display unit.

When a person's finger tip or an object touches a character or a particular position on a touch screen, the touch screen recognizes the touch position, thus receiving a user's input through the screen touch, without the use of a keypad.

Despite its low precision, the implementation of a touch screen eliminates the need for a keypad while increasing the ease of use of a device. Thus, the touch screen is often used as a display device in public places, that is, a subway, a department, a bank, etc., and is also widely used for commercial terminals in various shops. Recently, the touch screen has been used for portable terminals such as a cellular phone, a Digital Multimedia Broadcasting (DMB) receiver, a vehicle navigation, and so forth.

Types of a touch panel (or touch screen) may include a resistive type, a capacitive type, a surface acoustic wave type, an infrared beam type, and so forth.

In a typical touch panel of a capacitive type, a first electrode line and a second electrode line are respectively formed on a first film and a second film, and the first electrode line and the second electrode line are electrically connected with a controller through connection terminals. The controller senses a change in capacitance of a corresponding touch region of the touch panel, caused by a touch with an input means (e.g., a finger, a stylus pen, or the like), and determines a position of the touch region.

However, as the thickness of a portable terminal having the touch screen mounted thereon tends to be reduced and a distance between the touch panel and the display unit also tends to decrease, noise (e.g., electromagnetic waves) from the display unit causes malfunction of the touch panel.

Moreover, the conventional capacitive touch screen has a large thickness and a low transmissivity because of having a plurality of films.

That is, the conventional capacitive touch screen, because of having a plurality of films, has a large thickness and a low transmissivity, such that visibility of the screen degrades and reduction in the size of a product becomes difficult to achieve.

SUMMARY OF THE INVENTION

Aspects of the present invention are to address at least the above-mentioned problems and/or disadvantages and to provide at least the advantages described below. Accordingly, an aspect of the present invention is to provide a transparent adhesive unit for a touch screen, which is capable of restraining noise (e.g., electromagnetic waves) introduced from a display unit from causing malfunction of a touch panel, and a touch screen having the transparent adhesive unit.

Another aspect of the present invention is to provide a touch screen having a small thickness and a high transmissivity, thus improving the visibility of the screen and reducing the size of a product.

In accordance with an aspect of the present invention, a transparent adhesive unit for a touch screen is provided. The transparent adhesive unit includes a transparent film, a noise-blocking layer located on a first surface of the transparent film and formed of a conductive material, a first adhesive layer located on a surface of the noise-blocking layer, and a second adhesive layer located on a second surface of the transparent film, in which the second surface is positioned in opposition to the first surface.

In accordance with another aspect of the present invention, a touch screen including a display unit is provided. The touch screen comprises a plurality of pixels for displaying an image through the plurality of pixels, a touch panel comprising a protection plate exposed on a front surface of the touch screen and a conductive layer deposited on the protection plate, and a transparent adhesive unit for coupling the display unit and the touch panel to each other, in which the transparent adhesive unit includes a transparent film, a noise-blocking layer located on a first surface of the transparent film and formed of a conductive material, a first adhesive layer located on a surface of the noise-blocking layer, and a second adhesive layer located on a second surface of the transparent film, in which the second surface is positioned in opposition to the first surface.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
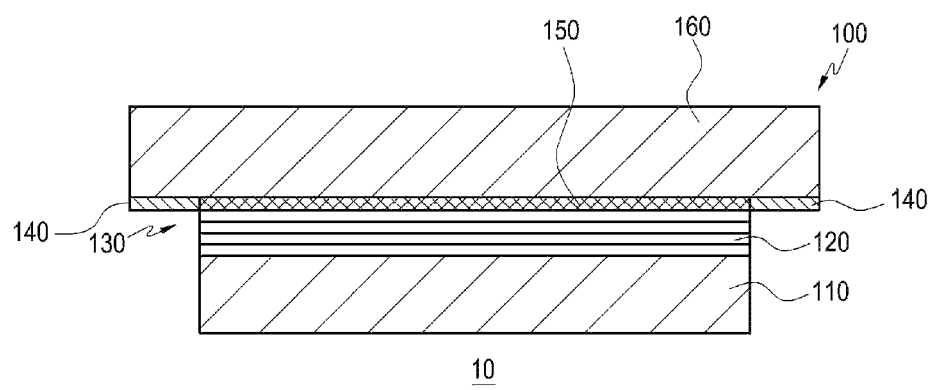
FIG. 1 is a diagram illustrating a touch screen according to a first exemplary embodiment of the present invention.

FIG. 1 is a diagram illustrating a touch screen according to a first exemplary embodiment of the present invention.

Referring to FIG. 1, a touch screen 10 may include a display unit 110, a touch panel 100, and a transparent adhesive unit 120. The touch panel 100 may include a protection plate 160 and a sensor layer 130 having a conductive layer 150 and connection terminals 140. The sensor layer 130 constitutes a sensor for recognizing a touched position upon a touch of a surface of the protection plate 160 by a person's fingertip or an object, and to this end, the conductive layer 150 has preset patterns.

The display unit 110 may include a plurality of pixels and displays an image through those pixels. A portion (central portion) of the top surface of the display unit 110 may be included in an effective display region of the touch screen 100, which is displayed to an observer, but to facilitate understanding, the entire top surface of the display unit 110 is included in the effective display region in the current example. The display unit 110 may be a Liquid Crystal Display (LCD), an Organic Light Emitting Diodes (OLEDs), and so forth.

The LCD displays an image under control of a controller (not shown). A typical LCD may include an LCD panel which may include a liquid crystal layer and displays an image, and a Back Light Unit (BLU) for providing light to the LCD panel. The LCD panel may include upper and lower glass substrates which are disposed on and under the liquid crystal layer to control an arrangement state of liquid crystal molecules. The lower glass substrate may include Thin Film Transistors (TFTs) and pixel electrodes, and the upper glass substrate may include a common electrode. The LCD panel further may include upper and lower polarization plates which are disposed on and under the liquid crystal layer to linearly polarize input light, respectively. Herein, the polarization directions of the upper and lower polarization plates may be orthogonal to each other.

The display unit 110 and the touch panel 100 are attached to each other by the transparent adhesive unit 120.

Figure 2:
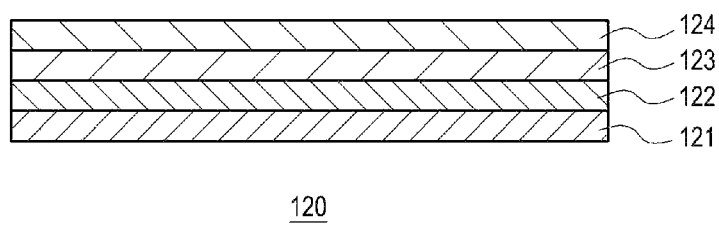
FIG. 2 is a diagram illustrating a transparent adhesive unit according to an exemplary embodiment of the present invention.

FIG. 2 is a diagram illustrating a transparent adhesive unit according to an exemplary embodiment of the present invention.

Referring to FIG. 2, the transparent adhesive unit 120 may include a transparent film 123, a noise-blocking layer 122, a first adhesive layer 121, and a second adhesive layer 124.

The transparent film 123 forms a base unit of the transparent adhesive unit 120, and is in the shape of a square plate having a globally uniform thickness. The transparent film 123 is formed of an insulating material which is transparent to visible light. Examples of the insulating material may include PolyEthylene Terephthalate (PET), PolyCarbonate (PC), PolyEthylene Naphthalate (PEN), PolyphenylEneSulfaid (PES), and so forth.

The noise-blocking layer 122 is located on a first surface (i.e., a bottom surface) of the transparent film 123, and is in the shape of a square plate having a globally uniform thickness. A material for the noise-blocking layer 122 may be one of Indium Tin Oxide (ITO), Zinc Oxide (ZnO), a conductive polymer, Carbon NanoTube (CNT), Zinc Tin Oxide (ZTO), Gallium Zinc Oxide (GZO), Aluminum Zinc Oxide (AZO), Indium Zinc Oxide (IZO), a Titanium Dioxide-Niobium material ($TiO_2$:Nb), a Magnesium Hydroxide-Carbon material ($Mg(OH)_2$:C), and Silver (Ag), or a combination thereof. The noise-blocking layer 122 may be formed on the transparent film 123 through deposition or coating. The noise-blocking layer 122 has a globally flat surface (i.e., a top surface) without having any pattern. The noise-blocking layer 122 may also be referred to as an electromagnetic wave blocking layer.

The first adhesive layer 121 is located on the surface (i.e., a bottom surface) of the noise-blocking layer 122, and is attached to a top surface of the display unit 110. The first adhesive layer 121 is formed of an insulating material which is transparent to visible light. For the first adhesive layer 121, an Optically Clear Adhesive (OCA) tape which is transparent to visible light, an adhesive (or pressure-sensitive adhesive), an infrared curable resin, or the like may be used. Both sides of the OCA tape can be adhesive, and may be formed of an acryl-based material, silicon, or the like.

The second adhesive layer 124 is located on a second surface (i.e., a top surface) of the transparent film 123 positioned in opposition to the first surface of the transparent film 123, and is attached to the conductive layer 150 of the sensor layer 130. The second adhesive layer 124 may be formed of a material which is the same as that of the first adhesive layer 121.

The transparent adhesive unit 120 simultaneously performs a function of attaching the display unit 110 and the touch panel 100 to each other, and a function of blocking noise from the display unit 110. The noise emitted from the display unit 110 is reflected by the noise-blocking layer 122 of the transparent adhesive unit 120 or otherwise fails to pass through the noise-blocking layer 122 and disappears while flowing along the surface of the noise-blocking layer 122. In an exemplary implementation, the noise-blocking layer 122 may be connected with ground.

Referring back to FIG. 1, the protection plate 160 is positioned on the display unit 110 and the sensor layer 130 is located on the bottom surface thereof. The top surface of the protection plate 160 forms at least a portion of the front surface of the touch screen 100. The protection plate 160 is formed of an insulating material which is transparent to visible light. Examples of the insulating material may include glass, PC, PET, and so forth.

The sensor layer 130 is located on the bottom surface of the protection plate 160, and a lower end portion (or bottom surface) thereof is attached to an upper end portion (or top surface) of the display unit 110 by using the transparent adhesive unit 120.

The sensor layer 130 is located on the top surface of the protection plate 160, and the sensor layer 130 may include the conductive layer 150 and the connection terminals 140. The sensor layer 150 constitutes a sensor for recognizing a touched position upon a touch of the surface of the protection plate 160 by a person's fingertip or an object, and to this end, the conductive layer 150 has a preset pattern. The conductive layer 150 may have various patterns such as a linear lattice pattern, a diamond pattern, and so forth. In the following description, a linear lattice pattern will be used as an example.

Figure 3:
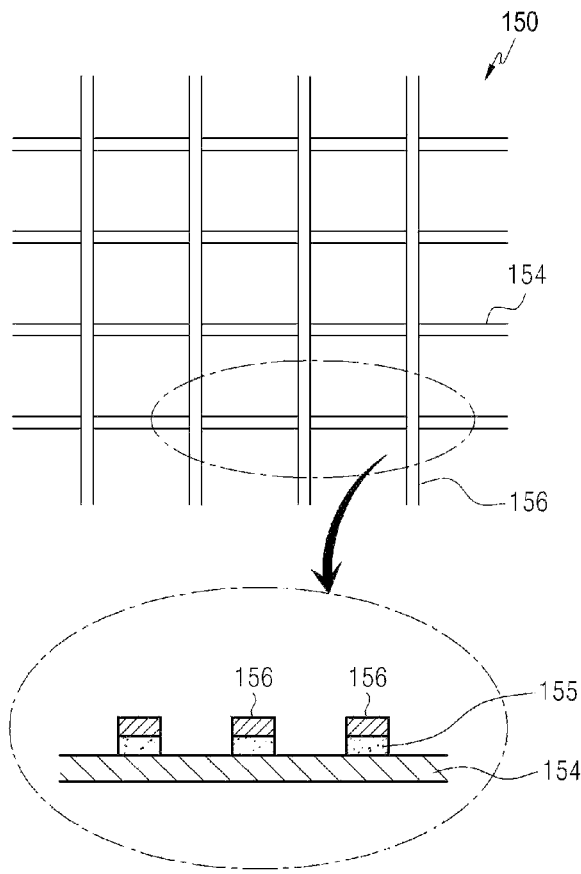
FIG. 3 is a diagram illustrating a pattern of a conductive layer according to an exemplary embodiment of the present invention.

FIG. 3 is a diagram illustrating a pattern of a conductive layer according to an exemplary embodiment of the present invention.

Referring to FIG. 3, the conductive layer 150 may include first electrode lines 154 and second electrode lines 156.

The first electrode lines 154 extend along a first direction (e.g., an x-axis direction or a horizontal direction), and are arranged at equal intervals or different intervals along a second direction (e.g., a y-axis direction or a vertical direction) which perpendicularly intersects the first direction.

The second electrode lines 156 extend along the second direction which perpendicularly intersects the first direction, and are arranged at equal intervals or different intervals along the first direction.

To electrically insulate the first electrode lines 154 and the second electrode lines 156 from each other, an insulating bridge layer 155 may be disposed at an intersecting portion between the first electrode line 154 and the second electrode line 156, so as to be interposed therebetween. For example, the bridge layer 155 may include bridge units positioned at intersecting portions between the first electrode lines 154 and the second electrode lines 156 in the form of a matrix arrangement. For the bridge layer 155, an insulating dielectric material such as $SiO_2$ may be used.

Referring back to FIG. 1, the conductive layer 150 is formed of a conductive material which is transparent to visible light. Examples of the conductive material include ITO, Poly(3,4-EthyleneDiOxyThiophene (PEDOT), and the like. The conductive layer 150 may be formed of a conductive thin film through vacuum deposition and then patterned through lithography processing. Examples of the vacuum deposition may include Electronic beam (E-beam), sputtering, etc.

The connection terminals 140, for applying voltage (or current) to the conductive layer 150, are located on the bottom surface of the protection plate 160, so as to be positioned outside the conductive layer 150. That is, the connection terminals 140 are disposed outside the conductive layer 150 (i.e., on the periphery of the protection plate 160) to facilitate external access thereto.

The connection terminals 140 are electrically connected with the conductive layer 150 through connection lines (not shown), and the connection terminals 140 and the connection lines may be formed through a single processing together with the conductive layer 150, or through separate processing from the conductive layer 150. The connection terminals 140 may be formed of a material which is the same as that of the conductive layer 150, or may be formed of a material which is different from that of the conductive layer 150 (e.g., an opaque conductive material such as silver). The connection terminals 140 may be electrically connected with a Flexible Printed Circuit Board (FPCB) having, for example, a controller, etc., mounted thereon.

To perform a sensor function, a voltage of a preset waveform (i.e., a touch search signal) is applied to the conductive layer 150. Thus, upon a touch of the surface of the protection plate 160 by a conductive user input means, a touch sense signal whose voltage waveform is changed due to a change in capacitance between the conductive 150 and the user input means is generated. The controller analyzes the touch sense signal and recognizes the occurrence of the touch by the user input means and a position of the touch.

The touch panel 100 is attached (i.e., adhered) to the display unit 110 by using the transparent adhesive unit 120. That is, the lower end portion (i.e., the bottom surface) of the touch panel 100 (i.e., the bottom surface of the sensor layer 130) is attached to the upper end portion (i.e., the top surface) of the display unit 110 by using the transparent adhesive unit 120.

The bottom surface of the protection plate 160 may be Anti-Reflect (AR) coated, and the AR-coated layer may include an $Nb_2O_5$ layer and a $SiO_2$ layer. The AR-coated protection plate 160 has a chroma value in which a* is less than 1.5 and b* is less than 1.5; a transmissivity of 91% or higher; and a refractive index of 5-10%. The touch panel 100 has a transmissivity of 88% or higher. Herein, a* and b* are elements of a International Commission on Illumination (CIE) coordinate system which indicates colors, such that a stronger color is indicated as a value of a* or b* moves farther away from 0. In this case, the conductive layer 150 is deposited on the AR-coated layer.

Since the top surface of the protection plate 160 is externally exposed, a light-blocking layer for blocking visible light may be located on the periphery of the bottom surface of the protection plate 160, so as to prevent the periphery of the outside of the central portion, which is included in the effective display region, from being exposed to the outside, and the light-blocking layer may be formed through processing such as black-ink printing. In an exemplary implementation, the connection terminals 140 are located on the light-blocking layer.

Figure 4:
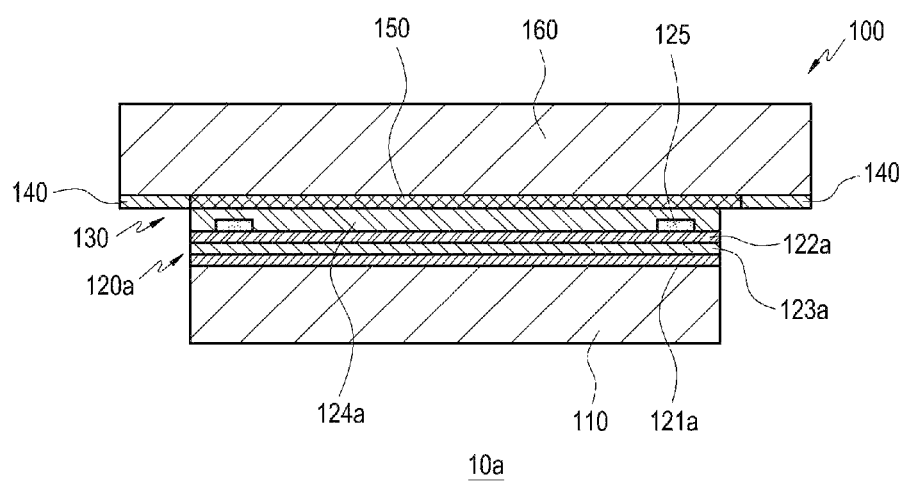
FIG. 4 is a diagram illustrating a touch screen according to a second exemplary embodiment of the present invention.
Figure 5:
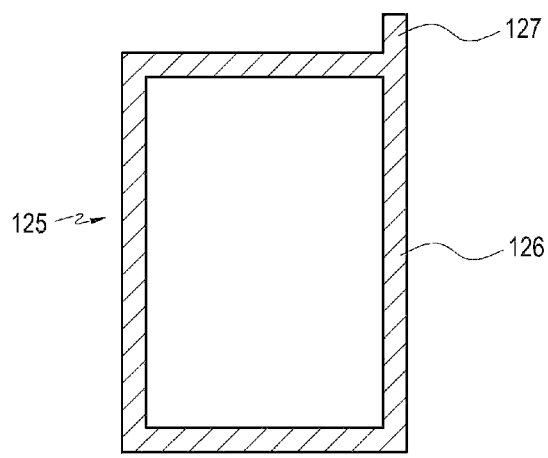
FIG. 5 is a plane view illustrating a characteristic-improved noise-blocking auxiliary layer according to an exemplary embodiment of the present invention.

FIG. 4 is a diagram illustrating a touch screen according to a second exemplary embodiment of the present invention, and FIG. 5 is a plane view illustrating a characteristic-improved noise-blocking auxiliary layer according to an exemplary embodiment of the present invention.

Referring to FIG. 4, the touch screen 10a has a structure which is similar to the touch screen 10 illustrated in FIG. 1, except that a deposition order of a transparent film 123a and a deposition order of a noise-blocking layer 122a in a transparent adhesive unit 120a are interchanged with each other. The transparent adhesive unit 120a further may include the noise-blocking auxiliary layer 125. Therefore, identical reference numerals or consecutive reference numerals (e.g., 121, 121a, etc.) are used for identical components, and a repetitive description of the identical components will be omitted.

The transparent adhesive unit 120a may include a first adhesive layer 121a, a transparent film 123a, a noise-blocking layer 122a, a second adhesive layer 124a, and the noise-blocking auxiliary layer 125.

The noise-blocking auxiliary layer 125 is located at an edge of the top surface of the noise-blocking layer 122a, and has a closed loop shape. In an exemplary embodiment, the noise-blocking auxiliary layer 125 has an uninterrupted quadrangular loop shape.

Referring to FIG. 5, the noise-blocking auxiliary layer 125 may include a first portion 126 in a rectangular ring-shape and at least one second portion 127 which extends in a protruding manner outwardly from the first portion 126. The noise-blocking auxiliary layer 125 is surrounded by the second adhesive layer 124a in a way to be buried by the second adhesive layer 124a, and an end of the second portion 127 may be exposed outside the second adhesive layer 124a to be connected with an external ground.

The noise-blocking auxiliary layer 125 functions as a path for delivering noise flowing through a surface of the noise-blocking layer 122a to the external ground. The noise-blocking auxiliary layer 125 may have an arbitrary shape (a straight-line band shape, etc.) instead of a closed loop shape, but preferably has a closed loop shape which surrounds the center of the noise-blocking layer 122a to quickly absorb any noise flowing through the surface of the noise-blocking layer 122a in various directions from the center of the noise-blocking layer 122a in a distributed manner.

The noise-blocking auxiliary layer 125 functions to further stabilize a noise-blocking feature of the noise-blocking layer 122a. That is, when a user presses the touch panel 100, the noise-blocking feature of the noise-blocking layer 122a is changed due to a bending of the touch panel 100. The noise-blocking auxiliary layer 125 increases the noise absorbing speed, thus allowing the noise-blocking feature to be stably maintained regardless of a change in an external environment, such as the bending of the touch panel 100.

The noise-blocking auxiliary layer 125 may be formed of a transparent or opaque metal material, and preferably has an electrical conductivity higher than the noise-blocking layer 122a. For example, silver may be used as a material for the noise-blocking auxiliary layer 125. The noise-blocking auxiliary layer 125, when being formed of an opaque material, is preferably disposed perpendicularly under the light-blocking layer, i.e., disposed to be hidden by the light-blocking layer, to prevent the noise-blocking auxiliary layer 125 from being externally exposed.

Figure 6:
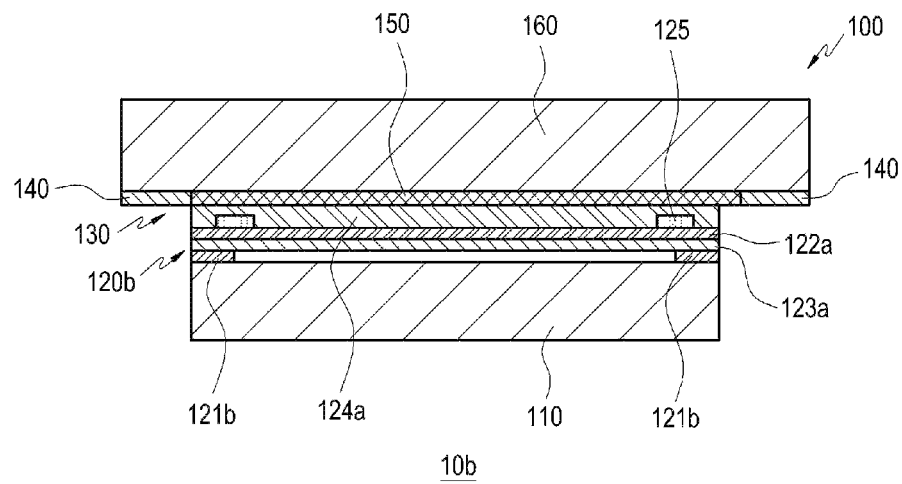
FIG. 6 is a diagram illustrating a touch screen according to a third exemplary embodiment of the present invention.

FIG. 6 is diagram illustrating a touch screen according to a third exemplary embodiment of the present invention.

Referring to FIG. 6, the touch screen 10b has a structure similar to the touch screen 10a illustrated in FIG. 4, except for the shape of a first adhesive layer 121b of the transparent adhesive unit 120b. Therefore, identical reference numerals will be used for identical components, and a repetitive description of the identical components will be omitted.

The first adhesive layer 121b is located on a bottom surface of the transparent film 123a and attached to the top surface of the display unit 110. The first adhesive layer 121b is located at the edge of the bottom surface of the transparent film 123a or at the edge of the top surface of the display unit 110, and has a quadrangular loop shape to allow an air layer between a central portion of the transparent film 123a and a central portion of the display unit 110, so that the noise-blocking feature can be further improved.

The touch screen having the transparent adhesive unit according to exemplary embodiments of the present invention can prevent malfunction of the touch panel from occurring due to noise, because the noise-blocking layer of the transparent adhesive unit blocks the noise from the display unit.

Moreover, in addition to the aforementioned advantages of the touch screen according to exemplary embodiments of the present invention, by attaching a touch screen panel to a display unit by using an OCA including the noise-blocking layer, the touch screen according to exemplary embodiments of the present invention can have a small thickness and a high transmissivity, thus improving the visibility of the screen and achieving slimness of a product. In an exemplary implementation, the touch screen panel includes a first transparent conductive layer which is formed on a bottom surface of a first substrate and includes a plurality of first transparent patterns arranged in a first direction, a first transparent insulating layer formed on a bottom surface of the first transparent conductive layer; a second transparent conductive layer which is formed on a bottom surface of the first transparent insulating layer and includes a plurality of second transparent patterns arranged in a second direction which is different from the first direction, and a first electrode layer which is formed at the edge of the first transparent conductive layer and at the edge of the second transparent conductive layer and includes electrically connected electrode patterns at respective ends of the plurality of first transparent patterns and at respective ends of the plurality of second transparent patterns.

The first substrate, the first transparent patterns, the first transparent conductive layer, the first transparent insulating layer, the second transparent patterns, the second transparent conductive layer, the electrode patterns, the first electrode layer, the touch screen panel, the noise-blocking layer, and the OCA correspond to the protection plate, the first electrode lines, a portion of the conductive layer (i.e., a layer including the first electrode lines in the conductive layer), the bridge layer, the second electrode lines, the remaining portion of the conductive layer (i.e., a layer including the second electrode lines in the conductive layer), the connection terminals, a layer including the connection terminals, the noise-blocking layer, and the transparent adhesive unit, respectively, in the above-described exemplary embodiment of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A transparent adhesive unit for a touch screen, the transparent adhesive unit comprising:
    a transparent film;
    a noise-blocking layer located on a first surface of the transparent film and formed of a conductive material;
    a second adhesive layer located on a surface of the noise-blocking layer;
    a noise-blocking auxiliary layer formed of a conductive material and as a continuous and closed quadrangular loop; and
    a first adhesive layer located on an edge of a second surface of the transparent film and having a quadrangular loop shape, the second surface being positioned in opposition to the first surface,
    wherein the noise-blocking auxiliary layer is located on the surface of the noise-blocking layer and within the second adhesive layer, and
    wherein the second adhesive layer is attached to a touch panel and the first adhesive layer is attached to a display unit.

2. The transparent adhesive unit of claim 1, wherein the noise-blocking auxiliary layer includes an extending portion.

3. The transparent adhesive unit of claim 1, wherein the noise-blocking layer comprises at least one of Indium Tin Oxide (ITO), Zinc Oxide (ZnO), a conductive polymer, Carbon NanoTube (CNT), Zinc Tin Oxide (ZTO), Gallium Zinc Oxide (GZO), Aluminum Zinc Oxide (AZO), Indium Zinc Oxide (IZO), a Titanium Dioxide-Niobium material (TiO2:Nb), a Magnesium Hydroxide-Carbon material (Mg(OH)2:C), and Silver (Ag).

4. The transparent adhesive unit of claim 3, wherein an electrical conductivity of the noise-blocking auxiliary layer is higher than an electrical conductivity of the noise-blocking layer.

5. The transparent adhesive unit of claim 1, wherein the noise-blocking auxiliary layer is completely surrounded by the second adhesive layer and the surface of the noise-blocking layer.

6. The transparent adhesive unit of claim 1, wherein an air layer is disposed between the transparent film and the display unit and completely surrounded by the first adhesive layer.

7. A touch screen comprising:
a display unit comprising a plurality of pixels for displaying an image through the plurality of pixels;
a touch panel comprising a protection plate exposed on a front surface of the touch screen and a conductive layer deposited on the protection plate; and
a transparent adhesive unit for coupling the display unit and the touch panel to each other,
wherein the transparent adhesive unit comprises:
a transparent film;
a noise-blocking layer located on a first surface of the transparent film and formed of a conductive material;
a second adhesive layer located on a surface of the noise-blocking layer;
a noise-blocking auxiliary layer formed of a conductive material and as a continuous and closed quadrangular loop; and
a first adhesive layer located on an edge of a second surface of the transparent film and having a quadrangular loop shape, the second surface being positioned in opposition to the first surface,
wherein the noise-blocking auxiliary layer is located on the surface of the noise-blocking layer and within the second adhesive layer, and
wherein the second adhesive layer is attached to the touch panel and the first adhesive layer is attached to the display unit.

8. The touch screen of claim 7, wherein the noise-blocking auxiliary layer includes an extending portion.

9. The touch screen of claim 7, wherein the noise-blocking layer comprises at least one of Indium Tin Oxide (ITO), Zinc Oxide (ZnO), a conductive polymer, Carbon NanoTube (CNT), Zinc Tin Oxide (ZTO), Gallium Zinc Oxide (GZO), Aluminum Zinc Oxide (AZO), Indium Zinc Oxide (IZO), a Titanium Dioxide-Niobium material (TiO2:Nb), a Magnesium Hydroxide-Carbon material (Mg(OH)2:C), and Silver (Ag).

10. The touch screen of claim 9, wherein an electrical conductivity of the noise-blocking auxiliary layer is higher than an electrical conductivity of the noise-blocking layer.

11. The touch screen of claim 7, wherein the noise-blocking auxiliary layer is completely surrounded by the second adhesive layer and the surface of the noise-blocking layer.

12. The touch screen of claim 7, wherein an air layer is disposed between the transparent film and the display unit and completely surrounded by the first adhesive layer.

* * * * *